(12) United States Patent
Kwon et al.

(10) Patent No.: US 9,466,986 B2
(45) Date of Patent: Oct. 11, 2016

(54) CURRENT GENERATION CIRCUIT

(71) Applicant: Hyundai Motor Company, Seoul (KR)

(72) Inventors: Soon-Myung Kwon, Seoul (KR); Sang Gyu Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 420 days.

(21) Appl. No.: 14/044,144

(22) Filed: Oct. 2, 2013

(65) Prior Publication Data

US 2014/0152106 A1    Jun. 5, 2014

(30) Foreign Application Priority Data

Dec. 3, 2012    (KR) .................. 10-2012-0139217

(51) Int. Cl.
*H02J 4/00* (2006.01)
*G05F 3/24* (2006.01)

(52) U.S. Cl.
CPC ............. *H02J 4/00* (2013.01); *G05F 3/242* (2013.01); *Y10T 307/549* (2015.04)

(58) Field of Classification Search
CPC ....... H02J 4/00; G05F 3/242; Y10T 307/549
USPC ........................................................ 307/52
See application file for complete search history.

(56) References Cited

U.S. PATENT DOCUMENTS

| | | | | |
|---|---|---|---|---|
| 5,180,995 A * | 1/1993 | Hayashi et al. | ................ | 331/57 |
| 5,783,936 A * | 7/1998 | Girard et al. | ................ | 323/315 |
| 6,091,286 A * | 7/2000 | Blauschild | ................ | 327/543 |
| 6,762,646 B1 * | 7/2004 | Bell | ................ | 330/257 |
| 6,799,889 B2 * | 10/2004 | Pennock | ................ | 374/178 |
| 7,075,353 B1 * | 7/2006 | Wan | ................ | G06F 1/04 327/295 |
| 7,227,401 B2 * | 6/2007 | Zhang | ................ | G05F 3/247 327/513 |
| 2007/0030050 A1 * | 2/2007 | Lee et al. | ................ | 327/513 |
| 2010/0148857 A1 * | 6/2010 | Chellappa | ................ | 327/538 |
| 2010/0225384 A1 * | 9/2010 | Hirose et al. | ................ | 327/543 |

FOREIGN PATENT DOCUMENTS

| | | |
|---|---|---|
| CN | 1828471 A | 9/2006 |
| CN | 1924751 A | 3/2007 |
| CN | 102122191 A | 7/2011 |
| CN | 102681587 A | 9/2012 |
| JP | 03-238513 | 10/1991 |
| JP | 2010-039844 A | 2/2010 |
| KR | 10-2011-0078451 | 7/2011 |
| KR | 10-2012-0051442 A | 5/2012 |
| KR | 10-2012-0056222 | 6/2012 |

* cited by examiner

*Primary Examiner* — Jared Fureman
*Assistant Examiner* — Michael Warmflash
(74) *Attorney, Agent, or Firm* — Mintz Levin Cohn Ferris Glovsky and Popeo, P.C.; Peter F. Corless (57) ABSTRACT

A current generating circuit that includes a first current source that generates a first current having a negative temperature coefficient a second current source that generates a second current having a positive temperature coefficient. A compensation circuit generates a common current using a first transistor that receives the first current and a second transistor formed in a mirroring structure, a third transistor that receives the second current, and a fourth transistor formed in a mirroring structure. In addition, the compensation circuit provides the common current as an output current using a transistor that is formed in at least a pair of mirroring structures.

9 Claims, 5 Drawing Sheets

CURRENT GENERATION CIRCUIT

CROSS-REFERENCE TO RELATED APPLICATION

This application claims priority to and the benefit of Korean Patent Application No. 10-2012-0139217 filed in the Korean Intellectual Property Office on Dec. 3, 2012, the entire contents of which are incorporated herein by reference.

BACKGROUND (a) Field of the Invention

The present invention relates to a current generating circuit. More particularly, the present invention relates to a circuit that supplies a constant current by stably operating during a temperature change.

(b) Description of the Related Art

In general, a circuit of electronic equipment is formed as a plurality of active and passive elements or as a chip in which an active element and a passive element are integrated. Each element constituting such electronic equipment requires a bias circuit that can provide a constant reference voltage or reference current for stable operation of the electronic equipment. Therefore, in an electronic equipment, a circuit that generates reference bias is an essential element.

Elements that are included in an electronic equipment have different characteristics based on temperature. For example, passive elements such as a resistor or an inductor have a characteristic that resistance increases proportional to an increase in temperature, when a temperature increases in elements such as a diode or a transistor, semiconductor elements having specific bonding has a resistance value inversely proportional to the temperature. A characteristic of such an element may be linear or non-linear. Therefore, a reference bias circuit has an influence on temperature characteristics. Temperature increase due to an external portion and an internal temperature increase due to internal integration of a chip may have a negative influence on a performance of an electronic equipment. Therefore, bias circuits are preferably less sensitive to rapid increases in temperature characteristics.

Particularly, in an integrated circuit that is formed with a semiconductor element, an area integration degree of a circuit is wide by using CMOS technology and is thus used in several fields, but stability of a driving operation is determined according to physical characteristics of a CMOS transistor. A typical factor of a change of physical characteristics is a temperature change.

A current source circuit included in semiconductor circuits determines an operating point (bias) of a transistor, which is a basic element of a semiconductor circuit. A CMOS transistor existing within a semiconductor circuit mirrors a reference current in which a current source circuit supplies current with a predetermined ratio and determines an operating point of the CMOS transistor using the mirrored current. Therefore, to stably perform a constant operation of a semiconductor circuit, it is essential in improving a performance of the semiconductor circuit to supply a uniform constant current regardless of a temperature change.

The above information disclosed in this Background section is only for enhancement of understanding of the background of the invention and therefore it may contain information that does not form the prior art that is already known in this country to a person of ordinary skill in the art.

SUMMARY

The present invention provides a constant current generating circuit having advantages of supplying a constant current to determine an operating point (bias) at a transistor, which is a basic element of a semiconductor circuit without a change of an operation temperature.

An exemplary embodiment of the present invention provides a current generating circuit as a constant current generating circuit that may include: a first current source that generates a first current having a negative temperature coefficient; a second current source that generates a second current having a positive temperature coefficient; and a compensation circuit that generates a common current using a first transistor that receives the first current and a second transistor that is formed in a mirroring structure, a third transistor that receives the second current, and a fourth transistor that is formed in a mirroring structure and that provides the common current as an output current using a transistor that is formed in at least a pair of mirroring structures.

A current amount of the first current and a current amount of the second current may be adjusted between the first transistor and the second transistor and between the third transistor and the fourth transistor, respectively using a width/length (W/L) ratio of the transistor. In addition, the common current may have a corresponding temperature coefficient within a predetermined error range in an intermediate value of the negative temperature coefficient and the positive temperature coefficient.

The first transistor, the second transistor, the third transistor, and the fourth transistor may be a metal-oxide-semiconductor field-effect transistor (MOSFET) transistor of an N-type channel. The common current may be transferred to a transistor that is formed in a pair of mirroring structures and thus a current amount thereof may be adjusted, and the output current may be a source current. The transistor that is formed in the pair of mirroring structures may control a current amount of a common current that is provided to the output current by adjusting a width/length (W/L) ratio of a transistor that has a gate connected to a gate of a transistor in which the common current is transferred against a width/length (W/L) ratio of a transistor.

The transistor that is formed in the pair of mirroring structures may be a MOSFET transistor of a P-type channel. The common current may be transferred to a transistor that is formed in two pairs of mirroring structures and thus a current amount thereof may be adjusted, and the output current may be a sink current. The transistor that is formed in the two pairs of mirroring structures may include a first pair of transistors to which the common current is transferred and a second pair of transistors that output the output current, and the first pair of transistors may be a MOSFET transistor of a P-type channel, and the second pair of transistors may be a MOSFET transistor of an N-type channel.

Two transistors of a mirroring structure constituting the first pair of transistors and the second pair of transistors, respectively may control a current amount flowing to the transistor by adjusting a W/L between two transistors of the mirroring structure. Each of sources of the first pair of transistors may be connected to a first power source that applies a predetermined high level constant voltage, and each of sources of the second pair of transistors may apply a constant voltage of a level lower than the high level constant voltage or be connected to a second power source having a ground potential.

According to the present invention, by providing a current source circuit that is not sensitive to a temperature change, a substantially small temperature coefficient may be embodied in a substantially wide temperature range and thus a semiconductor circuit may be stably operated. Particularly, according to the present invention, by compensating a temperature change by mutually supplementing a positive temperature coefficient and a negative temperature coefficient, a current generating circuit that generates a constant current may be embodied and thus performance stability of electronic equipments that are formed with a semiconductor circuit may be improved, thereby enhancing reliability.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising," will be understood to imply the inclusion of stated elements but not the exclusion of any other elements.

Figure 1:
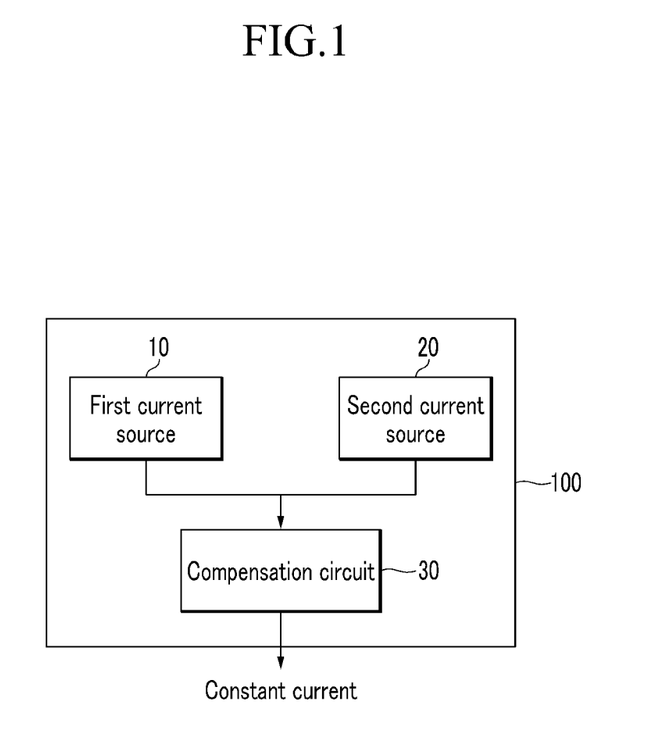
FIG. 1 is an exemplary block diagram illustrating a configuration of a current generating circuit according to an exemplary embodiment of the present invention.

FIG. 1 is an exemplary block diagram illustrating a configuration of a current generating circuit according to an exemplary embodiment of the present invention. Referring to FIG. 1, a current generating circuit 100 according to an exemplary embodiment of the present invention may include a first current source 10, a second current source 20, and a compensation circuit 30 that is connected to the first current source 10 and the second current source 20 to receive the first current and the second current and to generate a predetermined constant third current.

In particular, the third current may be a constant current that has a substantially small temperature coefficient insensitive to a temperature change. A constant current that is generated in the current generating circuit 100 of the present exemplary embodiment may be supplied to each circuit of an electronic equipment and may be supplied in a form of a source current or a sink current.

The compensation circuit 30 may be independently connected to the first current source 10 and the second current source 20 and may be a circuit that reduces a temperature coefficient. A constant current that is output from the compensation circuit 30 may be formed by receiving an input of a current transferred from the first current source 10 and the second current source 20, and may have a reduced temperature coefficient by supplementing a temperature coefficient of each current transferred from the first current source 10 and the second current source 20. Since an output current of the compensation circuit 30 depends on a reduced temperature coefficient, a semiconductor circuit of an electronic equipment that receives the output current may stably operate in a wide temperature range.

The first current source 10 may be a circuit that generates a current that has a negative temperature coefficient. A configuration circuit of the first current source 10 is not particularly limited, but a current that is output from the first current source 10 follows a negative temperature coefficient. The negative temperature coefficient is not particularly limited, but may have a value of, for example, about −660 ppm/° C. In general, since a reference current, that is output based on a temperature increase, decreases, a convention circuit that generates a current having a negative temperature coefficient may not have as wide of a temperature operation range.

The second current source 20 may be a circuit that generates a current that has a positive temperature coefficient. A configuration circuit of the second current source 20 is not particularly limited, but a current that is output from the second current source 20 follows a positive temperature coefficient. The positive temperature coefficient is not particularly limited, but may have a value of, for example, about 692 ppm/° C.

In general, a conventional circuit that generates a current that has a positive temperature coefficient may be formed with elements in which resistance increases according to a temperature increase and thus an output reference current may not be stably output in a substantially wide temperature range. Therefore, the circuit may not have as wide of a temperature operation range.

Furthermore, in the current generating circuit 100 of the present exemplary embodiment, the first current source 10 that has a negative temperature coefficient and the second current source 20 that has a positive temperature coefficient may be independently connected to the compensation circuit 30, may receive and supplement an input of a reference current that has a negative temperature coefficient and a reference current that has a positive temperature coefficient, and may output a constant current that has a reduced temperature coefficient.

When a current according to a negative temperature coefficient, such as about −660 ppm/° C., and a current according to a positive temperature coefficient, such as about 692 ppm/° C., are input to the compensation circuit 30, a current according to a substantially small temperature coefficient of about 13.7 ppm/° C. level may be output via adjustment of a width ratio (W/L) between mirroring transistors, which are a configuration element of the compensation circuit 30. In particular, a temperature coefficient of the output constant current may be a value that is reduced by about 98% or more of a positive temperature coefficient or a negative temperature coefficient and thus a constant current may be stably output even in a wide temperature change of about −40 to 125° C.

Figure 2:
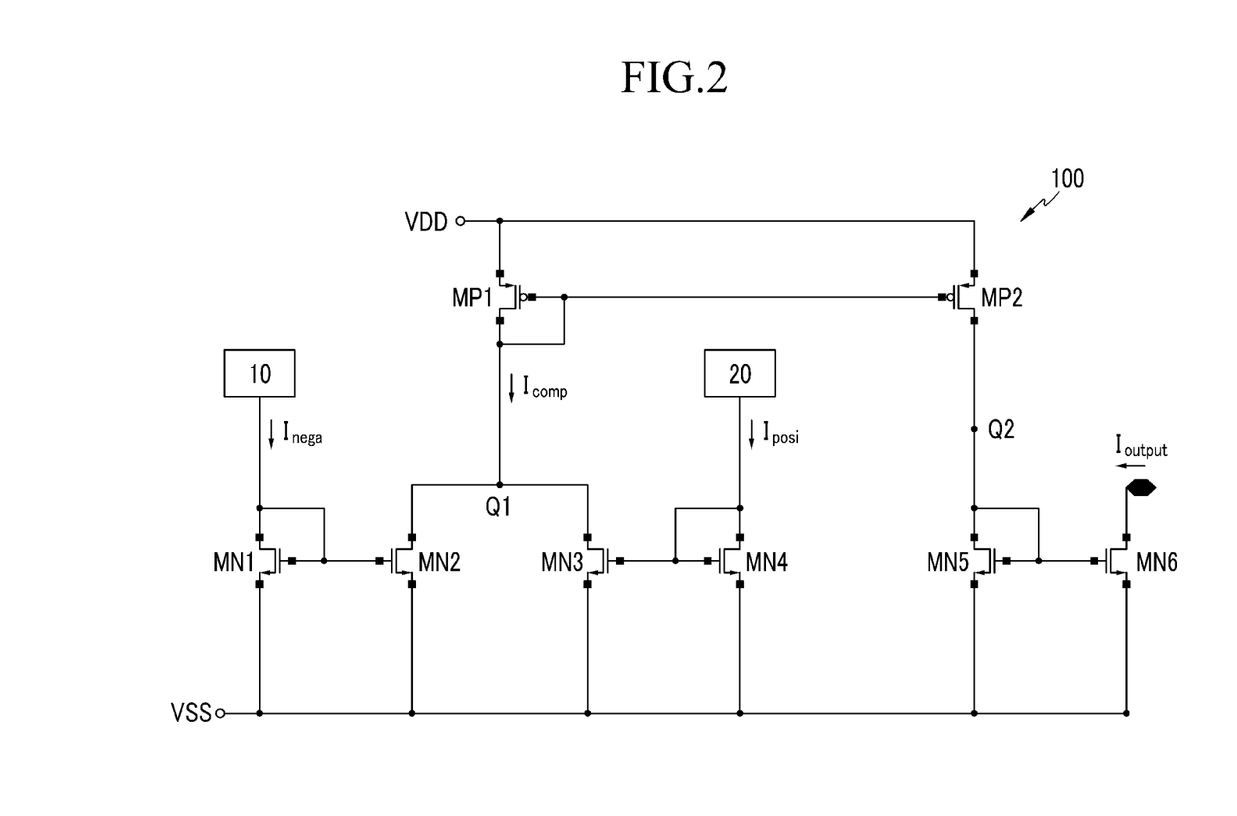
FIG. 2 is an exemplary detailed circuit diagram of the current generating circuit of FIG. 1 according to an exemplary embodiment of the present invention.

Hereinafter, a detailed circuit structure of the current generating circuit 100 according to an exemplary embodiment of FIG. 1 will be described. FIG. 2 is an exemplary detailed circuit diagram of the entire current generating circuit 100 of FIG. 1.

As described above, the current generating circuit 100 may include an input terminal connected to the first current source 10 that generates a current (hereinafter, a negative current represented as Inega) that has a negative temperature coefficient and the second current source 20 that generates a current (hereinafter, a positive current represented as Iposi) that has a positive temperature coefficient and an output terminal that outputs a constant current that has a temperature coefficient insensitive to a temperature change. The current generating circuit 100 may be connected to a first power source VDD and a second power source VSS. Here, the first power source VDD is a voltage source that supplies a predetermined high level voltage, and the second power source VSS is a voltage source that supplies a voltage of a level lower than that of a supply voltage of the first power source VDD. The second power source VSS may be a ground voltage source according to an exemplary embodiment.

In a circuit as shown in FIG. 2, a circuit is formed without the first current source 10 and the second current source 20 is the compensation circuit 30. Referring to FIG. 2, the compensation circuit 30 may include at least four transistor pairs that are formed in a mirroring structure. In other words, the compensation circuit 30 may be formed with a pair of P-type MOSFET (PMOS) transistors having a mirroring structure and three pairs of N-type MOSFET (NMOS) transistors having a mirroring structure. A constant current that is output from the current generating circuit 100 including the compensation circuit 30 of FIG. 2 may be a form of a sink current. The present invention is not limited thereto and an output constant current may be output in a source current form by changing a structure of the compensation circuit 30.

In the present exemplary embodiment, a channel type of a transistor of the current generating circuit 100 may be a mixed type of a P-type and an N-type, but the channel type is not limited thereto and a channel type of each transistor may be determined according to a signal level that is input to a gate electrode of each transistor and an operation state of each transistor according to the signal level.

Specifically, the compensation circuit 30 of FIG. 2 may be formed with a first transistor MN1, a second transistor MN2 that forms a mirroring structure with the first transistor MN1, a third transistor MN3, a fourth transistor MN4 that forms a mirroring structure with the third transistor MN3, a fifth transistor MN5, a sixth transistor MN6 that forms a mirroring structure with the fifth transistor MN5, a seventh transistor MP1, and an eighth transistor MP2 that forms a mirroring structure with the seventh transistor MP1. The first transistor MN1 to the sixth transistor MN6 may transistors that have an N-type channel, and the seventh transistor MP1 and the eighth transistor MP2 may be transistors that have a P-type channel.

The first transistor MN1 may include a drain connected to the first current source 10 to receive a negative current Inega, a gate connected to a gate of the second transistor MN2, and a source connected to the second power source VSS. The gate and the drain of the first transistor MN1 may be connected to each other.

The second transistor MN2 may include a drain connected to a first node Q1, a gate connected to the gate of the first transistor MN1, and a source connected to the second power source VSS.

The third transistor MN3 may include a drain connected to the first node Q1, a gate connected to a gate of the fourth transistor MN4, and a source connected to the second power source VSS.

The fourth transistor MN4 may include a drain connected to the second current source 20 to receive a positive current Iposi, a gate connected to the gate of the third transistor MN3, and a source connected to the second power source VSS. The gate and the drain of the fourth transistor MN4 may be connected to each other.

The fifth transistor MN5 may include a drain connected to a second node Q2, a gate connected to a gate of the sixth transistor MN6, and a source connected to the second power source VSS. The gate and the drain of the fifth transistor MN5 may be connected to each other.

The sixth transistor MN6 may include a drain connected to an output terminal that outputs a constant current, a gate connected to a gate of the fifth transistor MN5, and a source connected to the second power source VSS. At least one gate of configuration elements of various semiconductor circuits of an electronic equipment may be commonly connected to the output terminal to which the drain of the sixth transistor MN6 is connected. Therefore, the output terminal may receive a constant current that is output from the drain of the sixth transistor MN6.

When an output constant current is a sink current, (e.g., when the current generating circuit 100 operates as a sink current source) the fifth transistor MN5 and the sixth transistor MN6 may be formed, and when the current generating circuit 100 operates as a source current source, a configuration of the fifth transistor MN5 and the sixth transistor MN6 may be omitted. Therefore, when an output constant current is a source current, the second node Q2 may become an output terminal.

The seventh transistor MP1 may include a drain connected to the first node Q1, a gate connected to a gate of the eighth transistor MP2, and a source connected to the first power source VDD. The gate and the drain of the seventh transistor MP1 may be connected.

The eighth transistor MP2 may include a drain connected to the second node Q2, a gate connected to a gate of the seventh transistor MP1, and a source connected to the first power source VDD.

In a structure according to an exemplary embodiment of FIG. 2, the first current source 10 and the second current source 20 may be connected to the first transistor MN1 and the fourth transistor MN4, respectively, but a connection of the first current source 10 and the second current source 20 is not limited thereto and the first current source 10 and the second current source 20 may have a symmetric structure and thus the first current source 10 and the second current source 20 may be connected to the fourth transistor MN4 and the first transistor MN1, respectively.

Operation of the current generating circuit 100 having a circuit structure of FIG. 2 will be described.

A negative current Inega transferred to the drain of the first transistor MN1 may be output from the first current source 10 to the first transistor MN1, the second transistor MN2 connected in a mirroring structure to the first transistor MN1 may adjust a current amount flowing to the second transistor MN2 by adjusting a W/L ratio. In particular, a W/L is a width W to a length L ratio of a transistor. Since a resistance value of the transistor changes by adjusting a W/L ratio in the transistor, a current amount flowing to the transistor may be adjusted.

For example, when a W/L ratio of the second transistor MN2 to a W/L ratio of the first transistor MN1 is adjusted to a ratio of 1:n, a current amount flowing to the second transistor MN2 may be n times greater than a current amount of a negative current flowing to the first transistor MN1. In this way, by appropriately adjusting a W/L ratio of the second transistor MN2 to a W/L ratio of the first transistor MN1, a current value flowing to the second transistor MN2 may be determined.

A positive current Iposi transferred to the drain of the fourth transistor MN4 may be output from the second current source 20 and may flow through the fourth transistor MN4. The third transistor MN3 connected in a mirroring structure to the fourth transistor MN4 may adjust a current amount flowing to the third transistor MN3 by adjusting a W/L ratio. For example, when adjusting a W/L ratio of the third transistor MN3 to a W/L ratio of the fourth transistor MN4 to 1:m, a current amount flowing to the third transistor MN3 may be m times greater than a positive current flowing to the fourth transistor MN4. In this way, by appropriately adjusting a W/L ratio of the third transistor MN3 to a W/L of the fourth transistor MN4, a current value flowing to the third transistor MN3 may be determined.

Therefore, a current value of a common current Icomp that flows to the first node Q1 to which the drain of the second transistor MN2 and the drain of the third transistor MN3 are commonly connected may become a sum of a current flowing to the second transistor MN2 and the third transistor MN3 in which the current value may be adjusted. In other words, a common current Icomp that flows to the second transistor MN2 and the third transistor MN3 flows to the seventh transistor MP1 having a drain that may be connected to the first node Q1. In particular, since a temperature coefficient of a common current Icomp flowing to the seventh transistor MP1 compensates a negative temperature coefficient and a positive temperature coefficient, the temperature coefficient of a common current Icomp may be substantially small and thus, the common current Icomp may be insensitive to a temperature change.

Similarly, a common current Icomp that flows to the seventh transistor MP1 may adjust a W/L ratio of the eighth transistor MP2 of a mirroring structure in which a gate may be connected to a gate of the seventh transistor MP1, thereby adjusting a current amount of an output current Ioutput. In other words, by adjusting a W/L ratio of the eighth transistor MP2 to a W/L ratio of the seventh transistor MP1, an output current Ioutput, i.e., a current amount necessary for the inside of a semiconductor circuit of an electronic equipment that is connected to the current generating circuit 100 according to an exemplary embodiment of the present invention may be determined. Such an output current Ioutput is a current that may have a reduced temperature coefficient to be less sensitive to a temperature change, and thus a semiconductor circuit may perform a reliability operation using a stably supplied current even in a substantially wide temperature change range.

By connecting an element of a semiconductor circuit of an electronic equipment to the drain of the eighth transistor MP2, an output current Ioutput may be provided. In other words, the second node Q2 may be formed in an output terminal according to an embodiment of the present invention. In such an exemplary embodiment, the output current Ioutput may be output as a source current.

As another exemplary embodiment of the present invention, in a structure of FIG. 2 in which the fifth transistor MN5 connected to the second node Q2 and the sixth transistor MN6 connected to the gate of the fifth transistor MN5 may be added, an output current Ioutput may be output from the drain of the sixth transistor MN6 to a semiconductor circuit element of each electronic equipment. Such an output current Ioutput may be a sink current, and the output sink current may adjust again a current amount using a mirroring structure of the fifth transistor and the sixth transistor. In other words, a current that flows from the second node Q2 to the fifth transistor MN5 may add or subtract a current amount by adjusting a width ratio of the sixth transistor MN6 to a W/L ratio of the fifth transistor.

Figure 3:
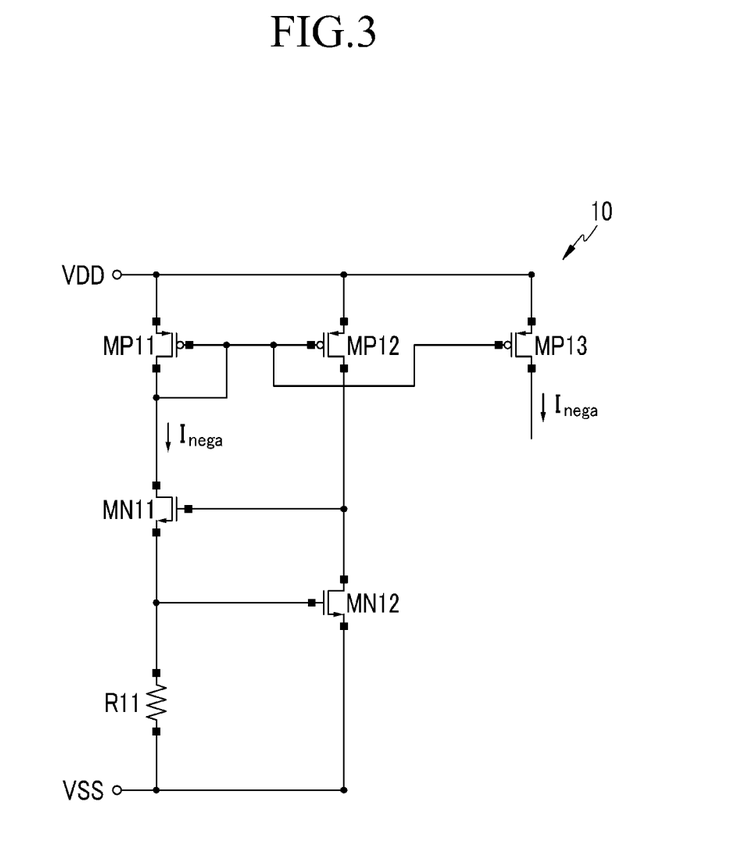
FIG. 3 is an exemplary circuit diagram illustrating a structure of a first current source in the current generating circuit of FIG. 1 according to an exemplary embodiment of the present invention.

FIG. 3 is an exemplary circuit diagram illustrating a structure of the first current source 10 according to an exemplary embodiment of the present invention in the current generating circuit 100 of FIGS. 1 and 2.

In FIG. 3, the first current source 10 according to an exemplary embodiment of the present invention may include five transistors MN11, MN12, MP11, MP12, and MP13 and one resistor R11. Here, the transistors MN11 and MN12 may be NMOS transistors, and the transistors MP11 to MP13 may be PMOS transistors. An entire transistor of the first current source 10 may receive an input of an operating point voltage to operate in a saturation area to be biased.

Referring to a structure of the first current source 10 according to an exemplary embodiment of FIG. 3, the transistor MP11 may include a source connected to the first power source VDD, a gate connected to a gate of the transistor MP12, and a drain connected to the drain of the transistor MN11. The drain and the gate of the transistor MP11 may be connected to each other.

The transistor MP12 may include a source connected to the first power source VDD, a gate connected to the gate of the transistor MP11, and a drain connected to the gate of the transistor MN11. The transistor MP12 and the transistor MP11 may form a mirroring structure.

Furthermore, the transistor MP13 may include a source connected to the first power source VDD, a gate connected to each gate of the transistor MP11 and the transistor MP12, and a drain connected to an output terminal that outputs a negative current Inega that has a negative temperature coefficient.

The transistor MN11 may include a drain connected to the drain of the transistor MP11, a gate connected to a drain of the transistor MP12, and a source connected to a contact point to which a gate of the transistor MN12 and the resistor R11 may be commonly connected.

The transistor MN12 may include a drain connected to a contact point to which the gate of the transistor MN11 and the drain of the transistor MP12 may be commonly connected, a gate connected to a contact point to which the source of the transistor MN11 and the resistor R11 may be commonly connected, and a source connected to the second power source VSS. The resistor R11 may be disposed between the second power source VSS and a contact point to which the source of the transistor MN11 and the gate of the transistor MN12 are commonly connected.

When operation power is applied to the first power source VDD and the second power source VSS, the five transistors MN11, MN12, MP11, MP12, and MP13 may operate in a saturation area, and by the transistor MP11 and the transistor MP12 forming a mirroring structure, a negative current Inega that flows to the transistor MN11 may be generated. In particular, under the assumption that W/L ratios of the transistor MN11 and the transistor MN12 are substantially the same, the same current amount as that of a negative current Inega flowing to the transistor MP11 may flow to the transistor MP12. The negative current Inega that flows to the transistor MN11 may be determined by the transistor MN11, the transistor MN12, and the resistor R11.

In particular, a source voltage $V_{MN11,source}$ of the transistor MN11 and a voltage $V_{GS,MN11}$ between the gate-source of the transistor MN11 may be substantially the same, and the voltage values may be related to a threshold voltage $V_{th,MN11}$ of the transistor MN11 and thus a relationship of Equation 1 is formed.

$$V_{MN11,source} = V_{GS,MN11} = V_{th,MN11} + \sqrt{\frac{2I_{nega}}{K_{MN11}}} \quad \text{(Equation 1)}$$

where $K_{MN11}$ is an intrinsic proportional coefficient related to an oxidation capacity and electron mobility of a MOSFET transistor.

In such a condition, when a W/L ratio of the transistor MN11 is substantially large, a negative current Inega may be determined by Equation 2.

$$I_{nega} = \frac{V_{GS,MN11}}{R11} \quad \text{(Equation 2)}$$

where R11 is a resistance value of the resistor R11, and $V_{GS,MN11}$ is a voltage value between the gate-source of the transistor MN11.

Referring to Equations 1 and 2, a current amount of a negative current Inega is proportional to a voltage value between the gate-source of the transistor MN11, and this is proportional to a threshold voltage $V_{th,MN11}$ of the transistor MN11. Therefore, since a threshold voltage $V_{th,MN11}$ of the transistor MN11 has a negative temperature coefficient, a negative current Inega may also have a negative temperature coefficient.

The negative current Inega having a negative temperature coefficient may be output from the drain of the transistor MP13 to be input to the compensation circuit 30, as described above.

A circuit structure of the first current source 10 of FIG. 3 is one embodiment and is not limited to such a structure.

Figure 4:
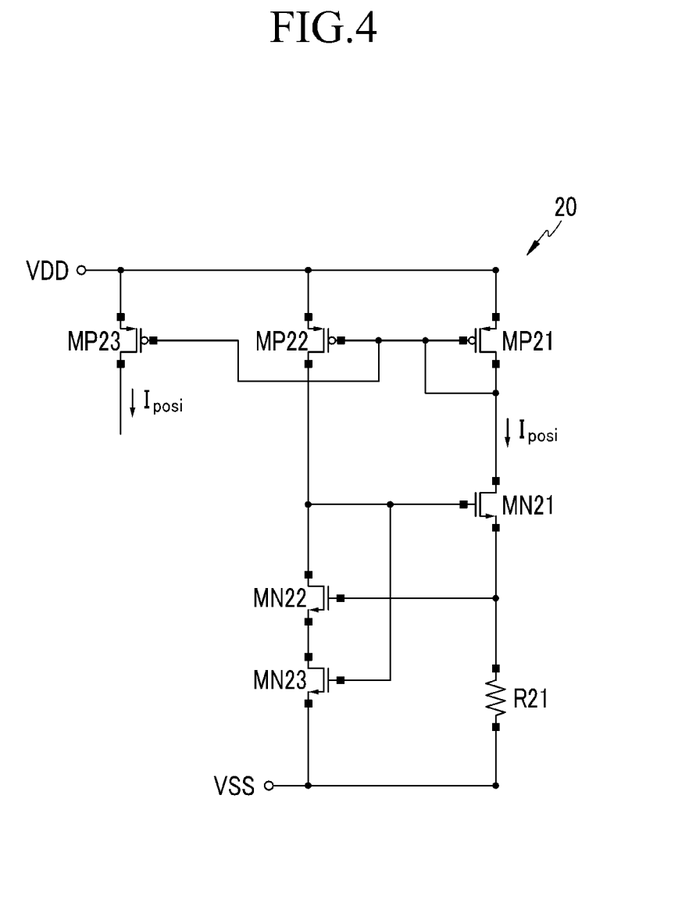
FIG. 4 is an exemplary circuit diagram illustrating a structure of a second current source in the current generating circuit of FIG. 1 according to an exemplary embodiment of the present invention.

FIG. 4 is an exemplary circuit diagram illustrating a structure of the second current source 20 according to an exemplary embodiment of the present invention. Referring to FIG. 4, the second current source 20 may include six transistors MN21, MN22, MN23, MP21, MP22, and MP23 and one resistor R21. Specifically, the transistors MN21 and MN23 may be NMOS transistors, and the transistors MP21 to MP23 may be a PMOS transistors.

A circuit structure of the second current source 20 of FIG. 4 is a structure that may add the transistor MN23 to the circuit structure of the first current source 10 of FIG. 3. Therefore, a connection relationship of the same circuit element as that of the first current source 10 is a repeated description and therefore a detailed description thereof will be omitted.

However, the transistor MN23 may be disposed between the transistor MN22 and the second power source VSS and may include a drain connected to a source of the transistor MN22, a gate of the transistor MN21 and a gate connected to a common connection node of a drain of the transistor MN22, and a source connected to the second power source VSS. The remaining transistors, except for the transistor MN23 may receive an input of an operating point voltage to operate in a saturation area to be biased.

When operation power is applied to the first power source VDD and the second power source VSS, six transistors MN21, MN22, MN23, MP21, MP22, and MP23 of the second current source 20 may operate in an entire saturation area, and a positive current Iposi that flows to the transistor MN21 may be generated by the transistor MP21 and the transistor MP22 forming a mirroring structure.

In this case, a current amount of a positive current Iposi may be determined by Equation 3.

$$I_{posi} = \frac{V_{GS,MN23} - V_{GS,MN21}}{R21} \quad \text{(Equation 3)}$$

where $V_{GS,MN23}$ is a voltage value between a gate-source of the transistor MN23, $V_{GS,MN21}$ is a value source between a gate-voltage of the transistor MN21, and R21 is a resistance value of the resistor R21.

Since the transistor MN23 may operate in a linear area, unlike other transistors, a resistance value $R_{MN23}$ due to the transistor MN23 may be determined by Equation 4.

$$R_{MN23} = \frac{2}{\mu_n C_{ox} \frac{W}{L}(V_{GS,MN11} - V_{th,MN23})}$$
$$\approx \frac{2}{\mu_n C_{ox} \frac{W}{L}(2V_{th,MN23} - V_{th,MN23})}$$
$$\approx \frac{2}{\mu_n C_{ox} \frac{W}{L} V_{th,MN23}} \quad \text{(Equation 4)}$$

where $\mu_n$ is electron mobility of the transistor MN23, $C_{ox}$ is an oxidation capacity of the transistor MN23, W is a width of the transistor MN23, L is a length of the transistor MN23, $V_{GS,MN23}$ is a voltage value between a gate-source of the transistor MN23, and $V_{th,MN23}$ is a threshold voltage of the transistor MN23.

A resistance value $R_{MN23}$ due to the transistor MN23 has a positive temperature coefficient and may obtain a current amount of a positive current Iposi that has a positive temperature coefficient using Equations 3 and 4 by determining an appropriate W/L ratio. The positive current Iposi that has a positive temperature coefficient may be output from a drain of the transistor MP23 to be input to the compensation circuit 30, as described above.

Figure 5:
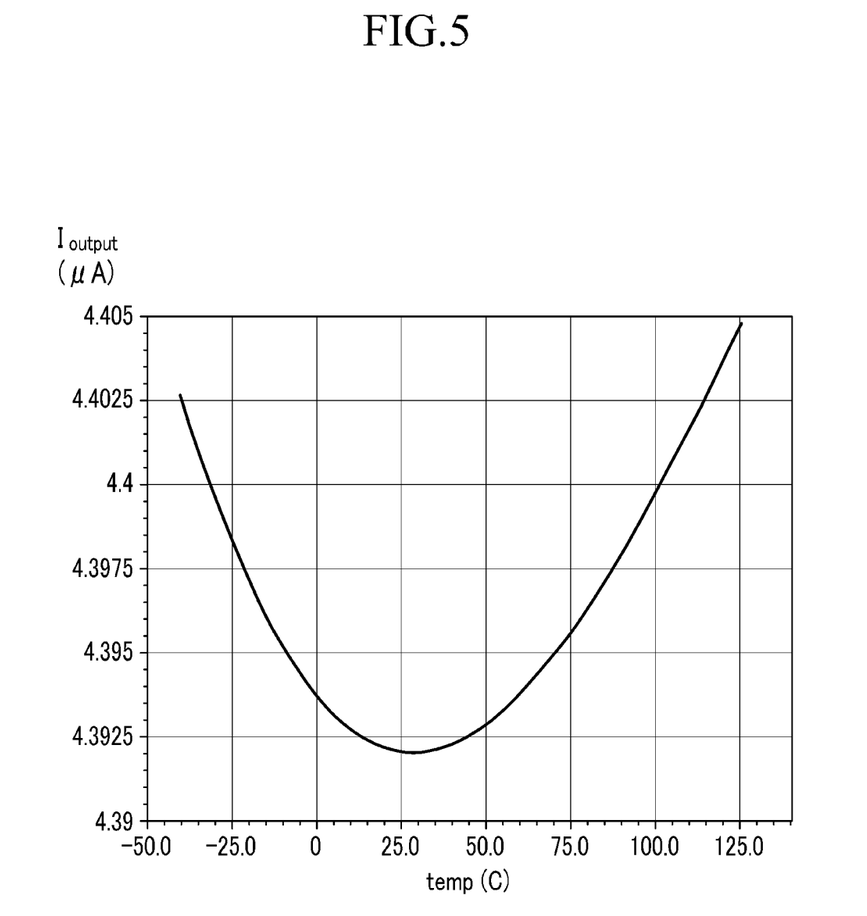
FIG. 5 is an exemplary graph illustrating a current generating circuit that outputs a stabilized reference current in a temperature change according to an exemplary embodiment of the present invention.

FIG. 5 is an exemplary graph illustrating that the current generating circuit 100 may output a reference current that is stabilized in a temperature change according to an exemplary embodiment of the present invention. The exemplary graph of FIG. 5 illustrates a change of an output current Ioutput of a vertical axis that is output from the current generating circuit 100 based on a temperature change of a horizontal axis.

As shown in FIG. 5, an output current Ioutput that is output by the current generating circuit 100 of the present exemplary embodiment may be constantly output with a current capacity of approximately 4.3925 to 4.405 µAs in a substantially wide temperature range of about −40 to 125° C. An output current Ioutput that is stable during a temperature change may be output as a current having a reduced temperature coefficient by coefficient adjustment for temperature compensation of the current generating circuit 100.

Further, to omit some of constituent elements that are described in this specification without degradation of a performance or to improve a performance thereof, a constituent element may be added by a person of a common skill in the art. Further, the order of steps of a method as described in this specification according to a process environment or an equipment may be changed by a person of a common skill in the art.

| Description of symbols | |
|---|---|
| 100: current generating circuit | 10: first current source |
| 20: second current source | 30: compensation circuit |

What is claimed is:

1. A constant current generating circuit, comprising:
a first current source that generates a first current that has a negative temperature coefficient;
a second current source that generates a second current that has a positive temperature coefficient; and
a compensation circuit that generates a common current using a first transistor that receives the first current and a second transistor formed in a mirroring structure, a third transistor that receives the second current, and a fourth transistor formed in a mirroring structure, wherein the compensation circuit provides the common current as an output current using a transistor formed in at least a pair of mirroring structures,
wherein the common current is transferred to a transistor formed in a pair of mirroring structures to adjust a current amount thereof, wherein the output current is a source current, and
the transistor that is formed in the pair of mirroring structures is a metal-oxide-semiconductor field-effect transistor (MOSFET) of a P-type channel.

2. The current generating circuit of claim 1, wherein a current amount of the first current and a current amount of the second current are adjusted between the first transistor and the second transistor and between the third transistor and the fourth transistor, respectively using a width/length (W/L) ratio of the transistor.

3. The current generating circuit of claim 1, wherein the common current has a corresponding temperature coefficient within a predetermined error range in an intermediate value of the negative temperature coefficient and the positive temperature coefficient.

4. The current generating circuit of claim 1, wherein the first transistor, the second transistor, the third transistor, and the fourth transistor are metal-oxide-semiconductor field-effect transistors (MOSFET) of an N-type channel.

5. The current generating circuit of claim 1, wherein the transistor that is formed in the pair of mirroring structures controls a current amount of a common current provided to the output current by adjusting a width/length (W/L) ratio of a transistor that has a gate connected to a gate of a transistor in which the common current is transferred based on a W/L ratio of a transistor.

6. A constant current generating circuit, comprising:
a first current source that generates a first current that has a negative temperature coefficient:
a second current source that generates a second current that has a positive temperature coefficient; and
a compensation circuit that generates a common current using a first transistor that receives the first current and a second transistor formed in a mirroring structure, a third transistor that receives the second current, and a fourth transistor formed in a mirroring structure, wherein the compensation circuit provides the common current as an output current using a transistor formed in at least a pair of mirroring structures,
wherein the common current is transferred to a transistor formed in two pairs of mirroring structures to adjust a current amount thereof, wherein the output current is a sink current.

7. The current generating circuit of claim 6, wherein the transistor that is formed in the two pairs of mirroring structures includes:
a first pair of transistors to which the common current is transferred; and
a second pair of transistors that output the output current,
wherein the first pair of transistors are metal-oxide-semiconductor field-effect transistors (MOSFET) of a P-type channel, and the second pair of transistors are MOSFET transistors of an N-type channel.

8. The current generating circuit of claim 7, wherein two transistors of a mirroring structure of the first pair of transistors and the second pair of transistors, respectively control a current amount that flows to the transistor by adjusting a width/length (W/L) ratio between two transistors of the mirroring structure.

9. The current generating circuit of claim 7, wherein each of sources of the first pair of transistors are connected to a first power source that applies a predetermined level constant voltage, and each of sources of the second pair of transistors apply a constant voltage of a level lower than the level constant voltage or is connected to a second power source that has a ground potential.

* * * * *